United States Patent
Catlin et al.

[11] Patent Number: 5,721,646
[45] Date of Patent: Feb. 24, 1998

[54] EXTERIOR REARVIEW MIRROR FOR VEHICLES

[75] Inventors: Michael R. Catlin, Holland; Edward A. Gahan, Fennville, both of Mich.

[73] Assignee: KAM Truck Components, Inc., Holland, Mich.

[21] Appl. No.: 604,758

[22] Filed: Feb. 23, 1996

[51] Int. Cl.$^6$ .............................. G02B 5/08; G02B 7/182; A47G 1/24

[52] U.S. Cl. .......................... 359/865; 359/872; 359/877; 248/476

[58] Field of Search ..................... 359/855, 864, 359/865, 871, 872, 877; 248/476, 481

[56] References Cited

U.S. PATENT DOCUMENTS

| | | | |
|---|---|---|---|
| D. 268,665 | 4/1983 | Sharp | D12/187 |
| D. 283,998 | 5/1986 | Tanaka | D12/187 |
| D. 302,964 | 8/1989 | Fingerle | D12/187 |
| D. 316,841 | 5/1991 | Neff | D12/187 |
| D. 318,837 | 8/1991 | Richardson et al. | D12/187 |
| D. 325,017 | 3/1992 | Richardson et al. | D12/187 |
| 3,346,229 | 10/1967 | Carson, Jr. | 248/477 |
| 3,375,053 | 3/1968 | Ward | 350/293 |
| 3,408,136 | 10/1968 | Travis | 350/293 |
| 3,476,464 | 11/1969 | Clark | 350/299 |
| 3,596,079 | 7/1971 | Clark et al. | 240/7.1 |
| 3,610,736 | 10/1971 | Bateman | 350/289 |
| 3,788,734 | 1/1974 | McDuffee, Sr. | 350/289 |
| 3,830,561 | 8/1974 | La Fave et al. | 350/289 |
| 4,022,520 | 5/1977 | Scifres | 350/304 |
| 4,027,953 | 6/1977 | Jacob | 350/288 |
| 4,094,591 | 6/1978 | Lafont | 350/289 |
| 4,101,206 | 7/1978 | Oskam et al. | 350/289 |
| 4,116,538 | 9/1978 | Oskam | 350/289 |
| 4,190,326 | 2/1980 | Brodbeck | 350/289 |
| 4,234,246 | 11/1980 | Wunsch et al. | 350/289 |
| 4,268,120 | 5/1981 | Jitsumori | 250/302 |
| 4,281,899 | 8/1981 | Oskam | 350/289 |
| 4,283,117 | 8/1981 | Ellis | 350/289 |
| 4,295,708 | 10/1981 | Albrecht et al. | 250/289 |
| 4,372,517 | 2/1983 | Welch et al. | 248/267 |
| 4,403,829 | 9/1983 | Thujiuchi et al. | 350/289 |

(List continued on next page.)

FOREIGN PATENT DOCUMENTS

| | | |
|---|---|---|
| 2043982 | 7/1992 | Canada. |
| 0287181A2 | 10/1988 | European Pat. Off.. |
| 0310261A1 | 4/1989 | European Pat. Off.. |
| 0490734A1 | 6/1992 | European Pat. Off.. |
| 0590510A1 | 4/1994 | European Pat. Off.. |
| 2628042 | 9/1989 | France. |
| 2649953 | 1/1991 | France. |
| 2409748 | 9/1975 | Germany. |
| 7905320.6 | 11/1981 | Germany. |
| 1186443 | 7/1989 | Japan. |
| WO 95 30495 | 11/1995 | WIPO. |

*Primary Examiner*—Paul M. Dzierzynski
*Assistant Examiner*—Mark A. Robinson
*Attorney, Agent, or Firm*—Van Dyke, Gardner, Linn & Burkhart, LLP

[57] ABSTRACT

An exterior rearview mirror assembly for vehicles such as trucks, vans and recreation vehicles provides reduced weight and vibration and improved stability. The assembly includes a mirror mount securing a reflective mirror element to an elongated support bracket, and a mirror housing secured to the support bracket and shielding the mirror element, mount and support bracket. The support bracket spans the interior of the housing from adjacent one end of the housing to adjacent the other end, is spaced from the side and rear walls of the housing, and has spaced, elongated support members and at least one brace member extending between the support members. Preferably, the brace members are arranged in an X-pattern along the bracket length, while the mirror mount is an electric actuator providing remote adjustment of the mirror element about multiple axes. In one form, the bracket may include a covering wall over the brace members and support members to increase rigidity and reduce vibration. Also, the bracket may support two spaced actuators for separate, independent adjustment of a planar mirror element and a convex mirror element.

62 Claims, 8 Drawing Sheets

U.S. PATENT DOCUMENTS

| | | | |
|---|---|---|---|
| 4,464,016 | 8/1984 | Weber et al. | 350/289 |
| 4,488,778 | 12/1984 | Polzer et al. | 350/631 |
| 4,498,738 | 2/1985 | Kumai | 350/637 |
| 4,502,759 | 3/1985 | Herzog et al. | 350/636 |
| 4,504,116 | 3/1985 | Sharp | 350/637 |
| 4,504,117 | 3/1985 | Mittelhauser | 350/636 |
| 4,540,252 | 9/1985 | Hayashi et al. | 350/634 |
| 4,555,166 | 11/1985 | Enomoto | 350/634 |
| 4,572,626 | 2/1986 | Suzuki | 350/634 |
| 4,623,115 | 11/1986 | Brester | 248/479 |
| 4,632,594 | 12/1986 | Del Tufo et al. | 403/322 |
| 4,648,693 | 3/1987 | Losch | 350/636 |
| 4,648,737 | 3/1987 | Lake, Jr. et al. | 403/322 |
| 4,670,679 | 6/1987 | Koot et al. | 310/99 |
| 4,693,571 | 9/1987 | Kimura et al. | 350/634 |
| 4,701,037 | 10/1987 | Bramer | 350/634 |
| 4,730,913 | 3/1988 | Boothe | 350/604 |
| 4,740,068 | 4/1988 | Fisher | 350/634 |
| 4,757,786 | 7/1988 | Ellegard | 123/2 |
| 4,763,381 | 8/1988 | Williams | 15/250.01 |
| 4,778,265 | 10/1988 | Fingerle et al. | 350/604 |
| 4,787,726 | 11/1988 | Hendricks | 350/637 |
| 4,804,257 | 2/1989 | Schmidt et al. | 350/626 |
| 4,818,090 | 4/1989 | Righi | 350/634 |
| 4,877,214 | 10/1989 | Toshiaki et al. | 348/483 |
| 4,929,074 | 5/1990 | Urban | 350/625 |
| 4,973,147 | 11/1990 | Fujita et al. | 350/637 |
| 4,973,820 | 11/1990 | Mittelhauser | 219/219 |
| 4,988,178 | 1/1991 | Eifert | 350/631 |
| 5,015,824 | 5/1991 | Monter et al. | 219/219 |
| 5,042,932 | 8/1991 | Pent | 359/874 |
| 5,044,739 | 9/1991 | do Espirito Santo | 359/864 |
| 5,073,019 | 12/1991 | Ferreira do Espirito Santo | 359/872 |
| 5,082,361 | 1/1992 | McKee | 359/876 |
| 5,110,019 | 5/1992 | Lang et al. | 359/874 |
| 5,111,125 | 5/1992 | Barrs | 318/603 |
| 5,115,352 | 5/1992 | do Espirito Santo | 359/855 |
| 5,238,214 | 8/1993 | Syamoto et al. | 248/544 |
| 5,294,084 | 3/1994 | Syamoto et al. | 248/544 |
| 5,615,054 | 3/1997 | Lang et al. | 359/844 |

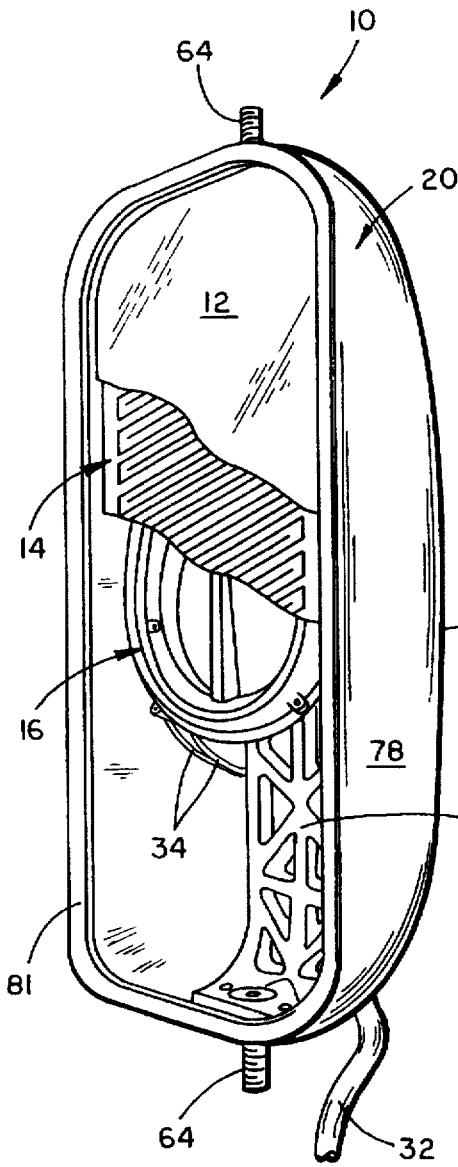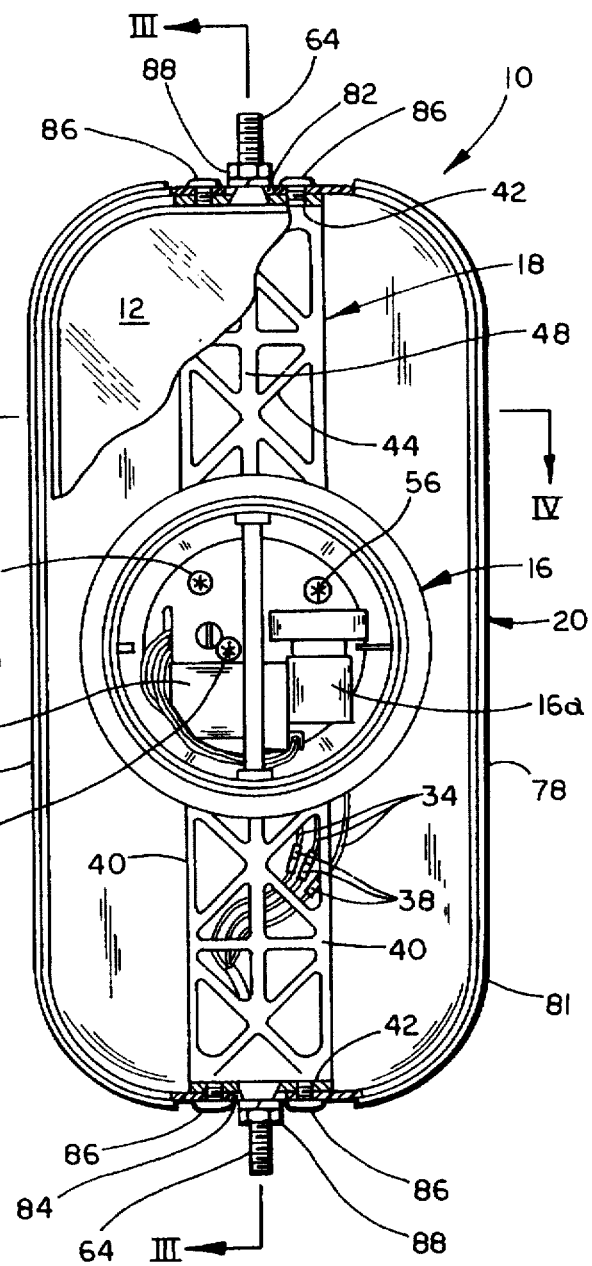
FIG. 1
FIG. 2

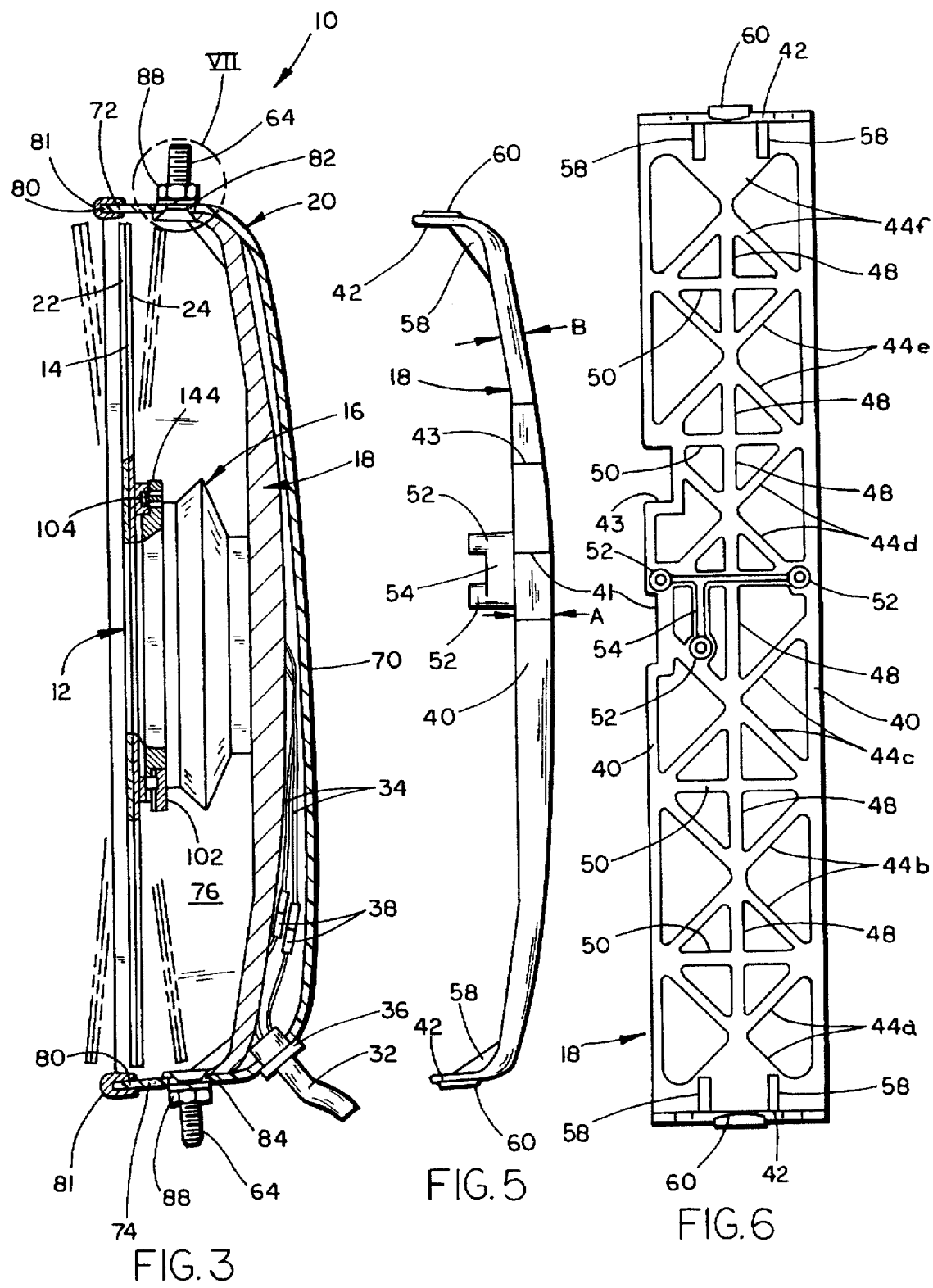

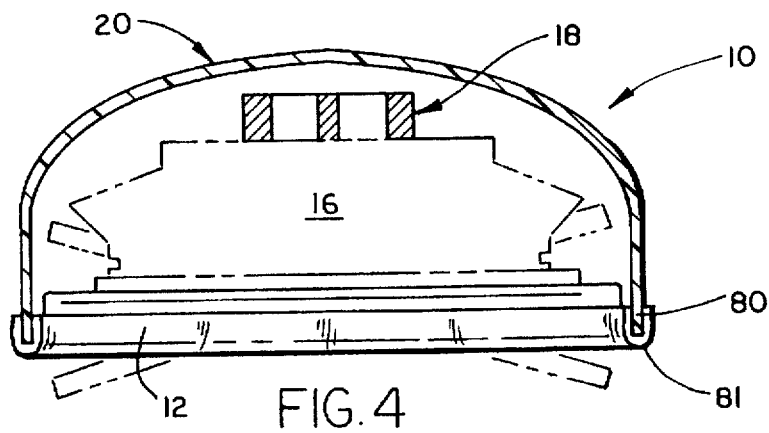
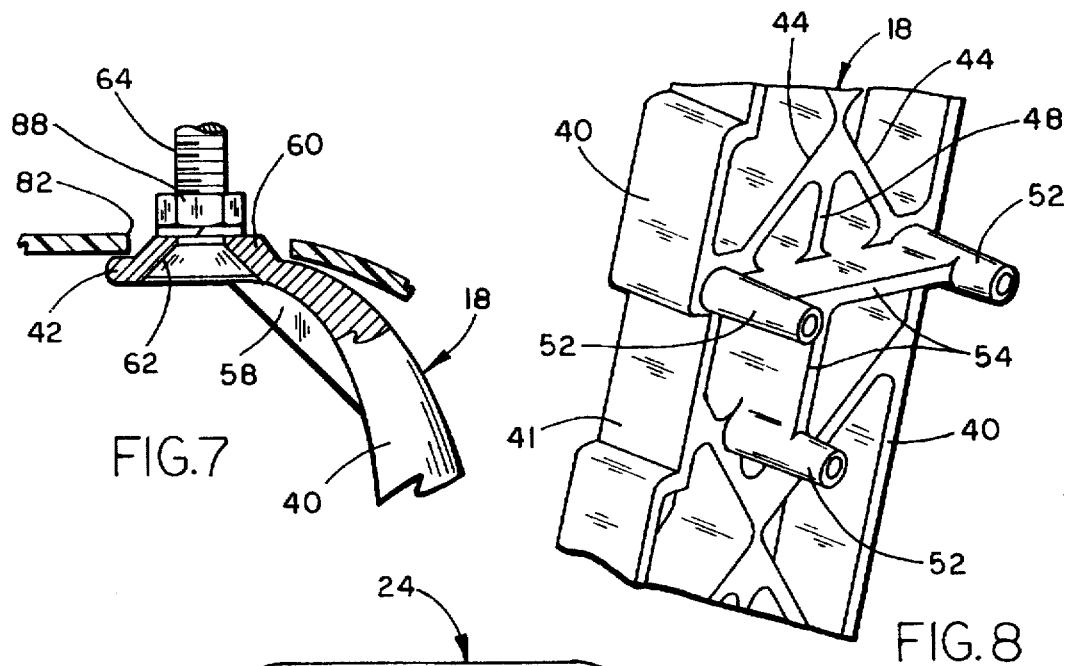
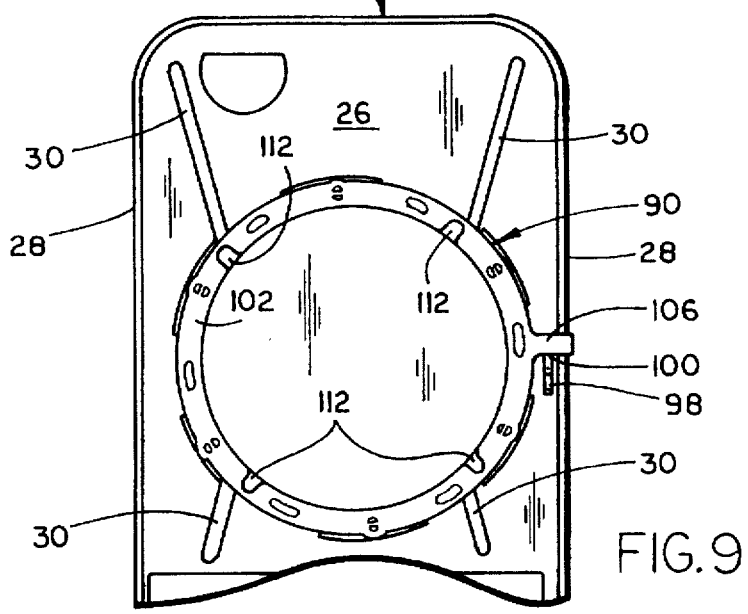

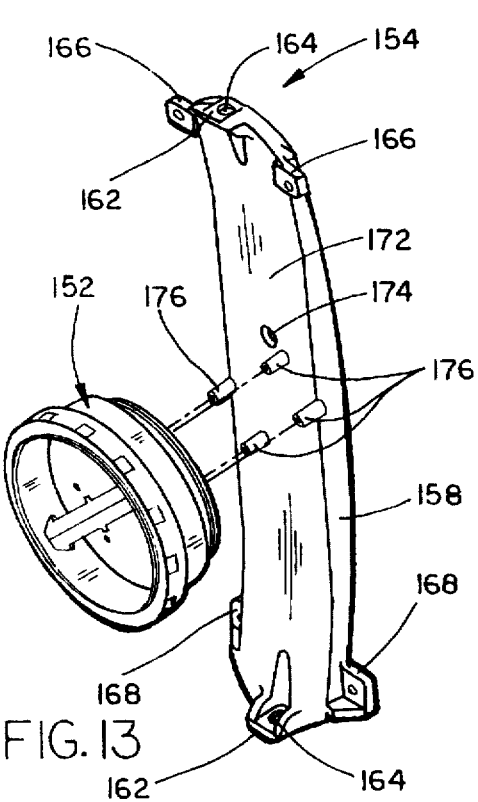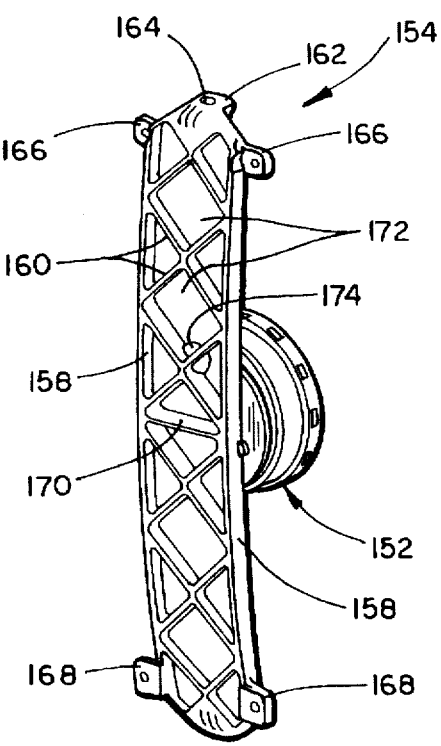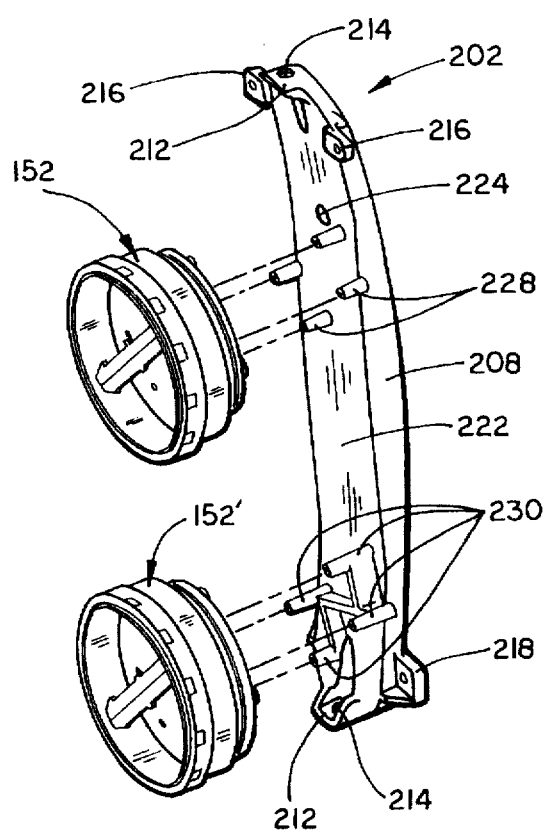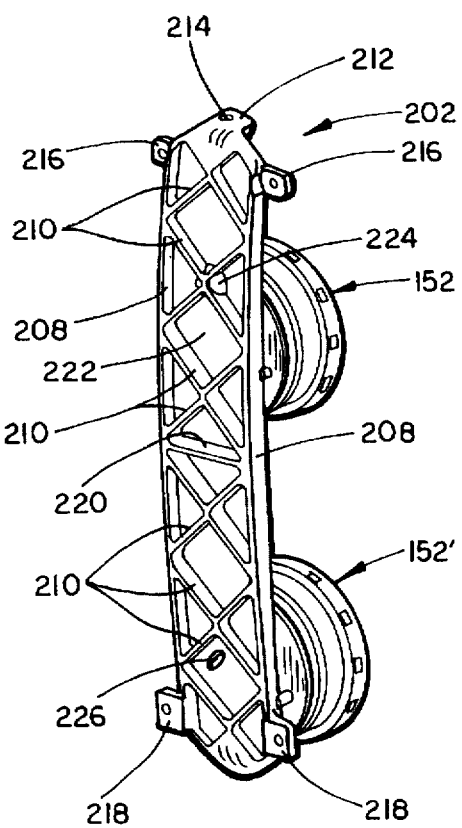

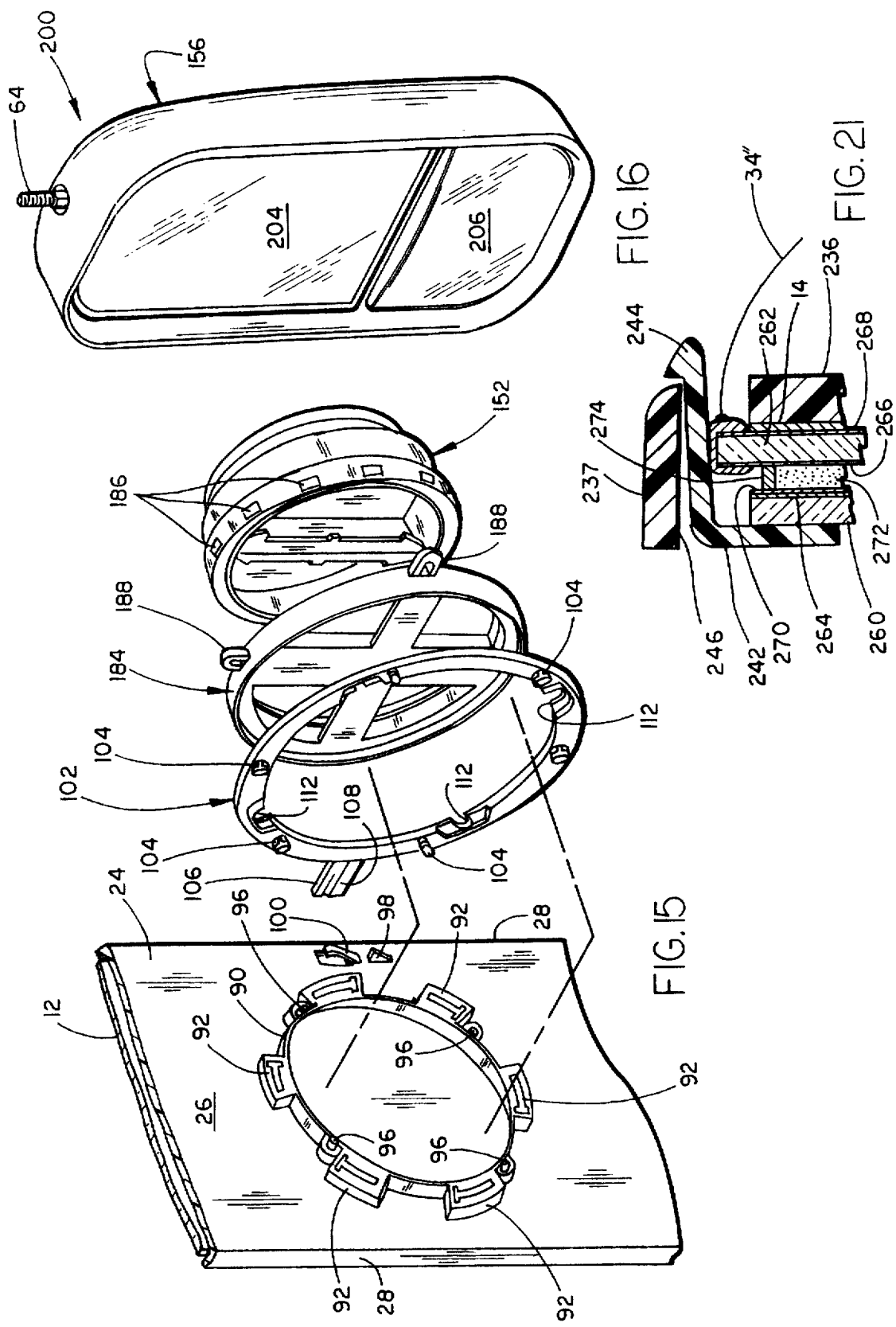

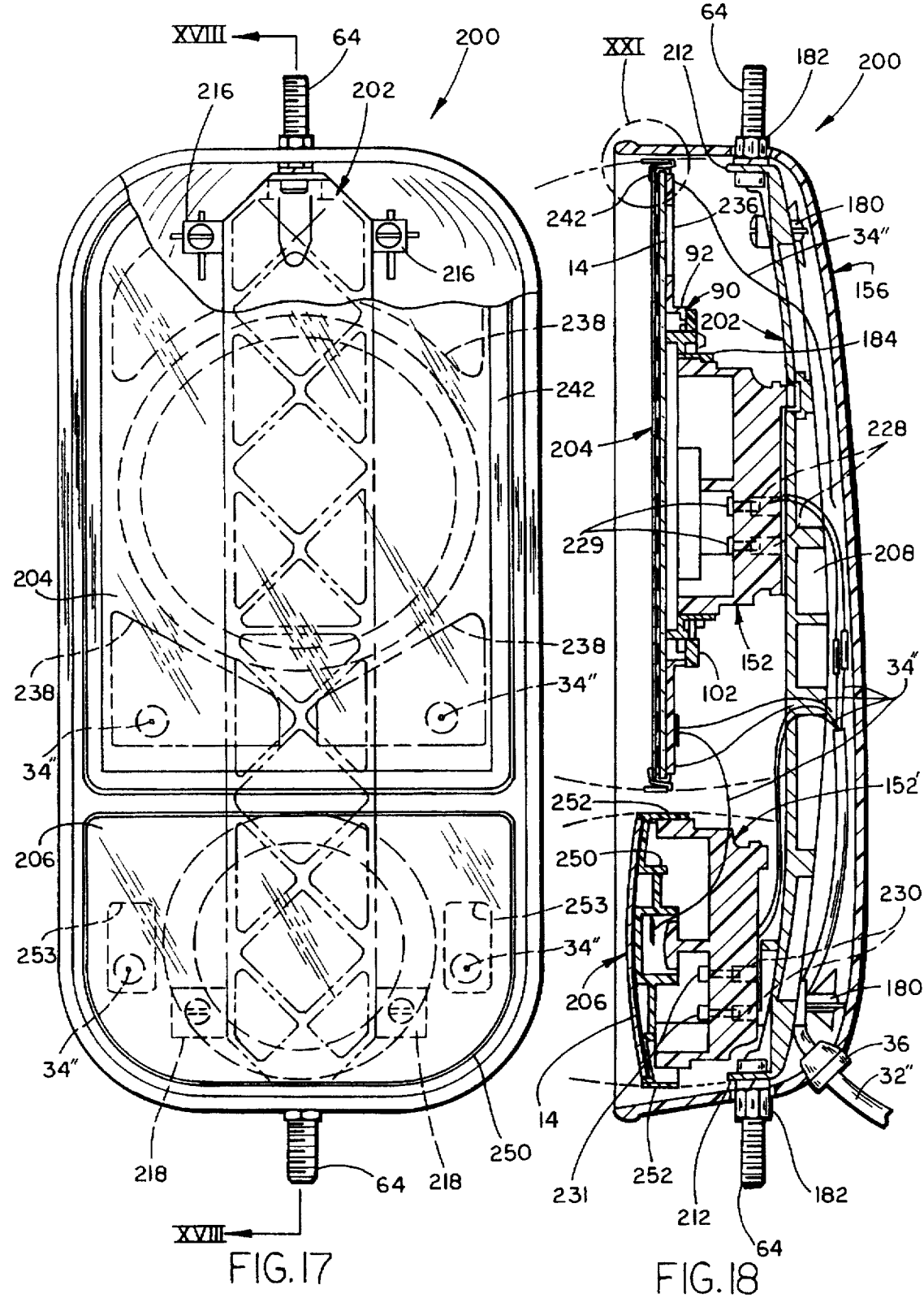

EXTERIOR REARVIEW MIRROR FOR VEHICLES

BACKGROUND OF THE INVENTION

This invention relates to rearview mirrors for vehicles and, more particularly, to exterior mirrors for use on larger vehicles, such as trucks, vans, recreational vehicles and the like which may be adjusted between one of several desired viewing positions.

Exterior rearview mirrors for vehicles are widely used on both automobiles which are primarily designed as passenger vehicles as well as on and larger, heavy transport or utility vehicles, such as trucks, vans and recreational vehicles (RV's). In automobiles and light trucks, it is desirable to position the exterior rearview mirror as close as possible to the car body to enable a better field of view for the vehicle driver. Typically, such mirrors are mounted on rigid mounting plates or specially designed supports secured in the opening of the side window or to the vehicle side door.

For larger, heavier vehicles, such as heavy trucks and semis, however, motor vehicle regulations in the United States and elsewhere require that exterior mirrors be spaced apart on the vehicle cab or tractor by at least 102 inches or more. As a result, to provide such wide spacing, the exterior mirrors on opposite sides of the truck cab or tractor are normally mounted on long support arms which creates a greater force moment acting on the rearview mirror at the end of the arms. A typical mounting is to the door of the truck cab which, in most cases, is not reinforced. Together with the fact that heavy truck suspensions are usually much stiffer and less resilient than those in automobiles and light trucks, the larger force moment and lack of reinforcement in the support areas on which the long truck mirror support arms are mounted creates significantly greater vibration during driving and use than in automobiles, light trucks and other smaller passenger-type vehicles.

In view of the greater vibration encountered with exterior rearview mirrors in larger vehicles, such as heavy trucks and semis, many prior known rearview mirror assemblies have proven to allow unsatisfactory levels of vibration. For example, many prior known exterior truck mirror assemblies have insufficient structural rigidity to resist vibration, or were constructed with centers of gravity displaced from the axis of support tending to accentuate any encountered vibration and road shocks. In addition, many current truck mirror assemblies have tended to be heavy which further accentuates the vibration encountered in heavy trucks. In addition, many of the prior known rearview mirror assemblies have incorporated non-aerodynamic designs in which the reflective mirror elements visible to the driver are mounted flush with the edge of the mirror housing. These designs suffered from severe wind buffeting and buildup of mist and dirt on the mirror viewing surface such that the driver's ability to view objects in the mirror was significantly reduced. When coupled with the increased vibration present in such assemblies, overall visibility with such mirror assemblies was inadequate.

The present exterior rearview mirror assembly was conceived in recognition of the above and related problems and is adapted to improve visibility with and operation of such mirrors.

SUMMARY OF THE INVENTION

Accordingly, the present invention provides an improved, exterior rearview mirror assembly for vehicles, and especially larger transport vehicles, such as heavy trucks, semis, vans, recreational vehicles and the like, including those vehicles subject to specific regulations with regard to wide spacing and positioning of exterior rearview mirrors.

The exterior rearview mirror assembly of the present invention provides a support with improved linear and torsional stiffness and rigidity as well as improved positioning of the center of gravity whereby vibration and consequent image blurring in the mirror is reduced. In addition, the mirror provides reduced mass and weight. Further, the assembly has an increased natural frequency which prevents resonance in normal vehicle operating ranges to help stabilize the mirror. The reduced weight and vibration also reduces stress on any mirror arms or supports which attach the mirror assembly to the vehicle.

In one form, the invention is an exterior rearview mirror assembly for vehicles, such as trucks, comprising at least one reflective mirror element, an elongated support bracket, and a mirror mount securing the mirror element to the support bracket to locate the mirror element in a viewing position. A mirror housing is secured to the support bracket and shields the support bracket, mirror mount and mirror element, the housing having first and second end walls, first and second side walls, a rear wall, and a peripheral rim defining an interior space within the housing and an opening adjacent the mirror element. The support bracket spans the interior space of the housing from a position adjacent the first end to a position adjacent the second end and is also spaced from the side walls and rear wall of the housing. The support bracket includes spaced, elongated support members and at least one brace extending between the support members such that the assembly has reduced weight and vibration and improved stability.

Various embodiments of the exterior rearview mirror assembly may include a single, planar reflective mirror element preferably adjustably mounted on the support bracket to allow movement to various viewing positions. In a preferred embodiment, the mirror mount is an electric actuator which is controllable from a remote location, such as the truck cab, by a driver or passenger in the vehicle, to change the mirror element viewing position. The mirror element together with a support plate are releasably secured to the actuator at the center of gravity of the mirror element by a rotatable, bayonet mounting and latch assembly. Thus, the mirror element is easily field replaceable for service and repair, which also allows access to the actuator for service or replacement. Preferably, each end of the support bracket includes a mounting stud which extends through the housing for attachment to a suitable support arm or arms mounted on the vehicle. The mounting studs are preferably aligned on a common axis to allow fixed positioning or pivotal movement of the entire assembly, depending on the type of support arms used.

The support bracket of the present invention preferably includes a plurality of braces extending between the support members, which braces are spaced from one another and define openings therebetween. Preferably, a series of pairs of such braces are provided with the braces in each pair intersecting in an X-shaped pattern. Additional braces may optionally extend between the points of intersection. The support bracket provides increased torsional and linear stiffness and rigidity to reduce vibration in the overall mirror assembly, and is also curved to position the center of gravity of the assembly as close as possible to the support axis.

In yet another modified form of the support bracket, a wall is provided along the side of the support bracket which faces the mirror element to further reduce vibration by increasing the natural frequency as well as the stiffness and rigidity of the bracket.

In other features of the invention, a pair of reflective mirror elements is provided in the assembly, each mirror element preferably mounted at spaced locations on the support bracket. These mirror elements may be either planar or convex. The mirror mounts preferably allow adjustment of the viewing position of each mirror element and are preferably electrically operated actuators to allow positioning of each mirror element from a remote location, such as the cab of the vehicle.

In yet other embodiments of the invention, the mirror element may be an electro-optic mirror element adapted to reduce the amount of reflected light when an electrical voltage is applied to the element. Preferably, such element is an electrochromic mirror element. In addition, any of the reflective mirror elements may be provided with electrical resistance-type heating pads to melt ice and snow which may collect on the viewing surface.

Further, in the preferred embodiments of the invention, the reflective mirror elements are recessed within the mirror housing from the plane defined by the peripheral rim surrounding the viewing opening of the housing. Such recessed positioning reduces wind buffering and creates an area of low air turbulence adjacent the mirror surface to prevent mist and dirt from collecting on the mirror.

Accordingly, the present invention provides an exterior rearview mirror assembly for vehicles including trucks, vans and the like, which has reduced vibration, increased stability and reduced weight to provide clearer viewing images for the vehicle driver. The assembly includes a unique support bracket which spans the interior of the mirror housing and supports the mirror elements on adjustable mounts, the support bracket being spaced from the housing walls and having support members and interconnecting braces and an optional stiffness improving wall to increase torsional and linear rigidity, and the natural frequency of the support bracket. In addition, the bracket positions the center of gravity of the mirror and mirror mounts as closely as possible to the axis of support of the assembly to further reduce vibrations. Mirror wobble is also reduced by centering the mirror element center of gravity on each actuator. The mirror assembly provides several variations to match the features desired by the vehicle driver including one or two mirror elements, electrical actuation of each mirror element from a remote location, planar or convex viewing surfaces, an electro-optic mirror element for reduced glare, heating elements to prevent ice and snow buildup, and an aerodynamic housing design to reduce the buildup of mist and dirt on the viewing surface.

These and other objects, advantages, purposes and features of the invention will become more apparent from a study of the following description taken in conjunction with the drawings.

BRIEF DESCRIPTION OF THE DRAWINGS

FIG. 1 is a front, perspective view of a first embodiment of the exterior rearview mirror assembly of the present invention having portions of the mirror element broken away to reveal the heating element and internal support structure;

FIG. 2 is a front elevation of the mirror assembly of FIG. 1, having portions of the mirror element and portions of the mirror housing broken away to reveal the support structure;

FIG. 3 is a partially sectional, side elevation of the mirror assembly of FIGS. 1 and 2 taken along plane III—III of FIG. 2;

FIG. 4 is a sectional, plan view of the rearview mirror assembly of FIGS. 1-3 taken along plane IV—IV of FIG. 2;

FIG. 5 is a side elevation of the support bracket of the mirror assembly of FIGS. 1-4;

FIG. 6 is a front elevation of the support bracket of the FIG. 5;

FIG. 7 is an enlarged, sectional, side elevation of area VII of FIG. 3;

FIG. 8 is a fragmentary, perspective view of the center section of the support bracket of FIGS. 5 and 6;

FIG. 9 is a fragmentary, rear elevation of the mirror element support plate and releasable mounting assembly thereon for securing the mirror element and mirror element support plate to the mirror mount/actuator;

FIG. 13 is an exploded, front perspective view of the modified support bracket and electric actuator of the rearview mirror assembly of FIGS. 11 and 12;

FIG. 14 is a rear perspective view of the modified support bracket and mirror actuator of FIG. 13;

FIG. 15 is a fragmentary, exploded, perspective view of a modified form of the releasable mounting assembly for releasably securing the reflective mirror element to the actuator of FIGS. 11-14;

FIG. 16 is a front perspective view of a third embodiment of the exterior rearview mirror assembly of the present invention;

FIG. 17 is a front elevation with portions broken away of the rearview mirror assembly of FIG. 16;

FIG. 18 is a sectional, side elevation of the rearview mirror assembly of FIG. 17 taken along plane XVIII—XVIII of FIG. 17;

FIG. 19 is an exploded, front perspective view of the modified support bracket and mirror actuators for the rearview mirror assembly of FIGS. 17 and 18;

FIG. 20 is a rear perspective view of the support bracket and actuators of FIG. 19; and FIG. 21 is an enlarged, side sectional view of the mirror element and support plate of area XXI—XXI of FIG. 18.

DESCRIPTION OF THE PREFERRED EMBODIMENTS

Figure 10:
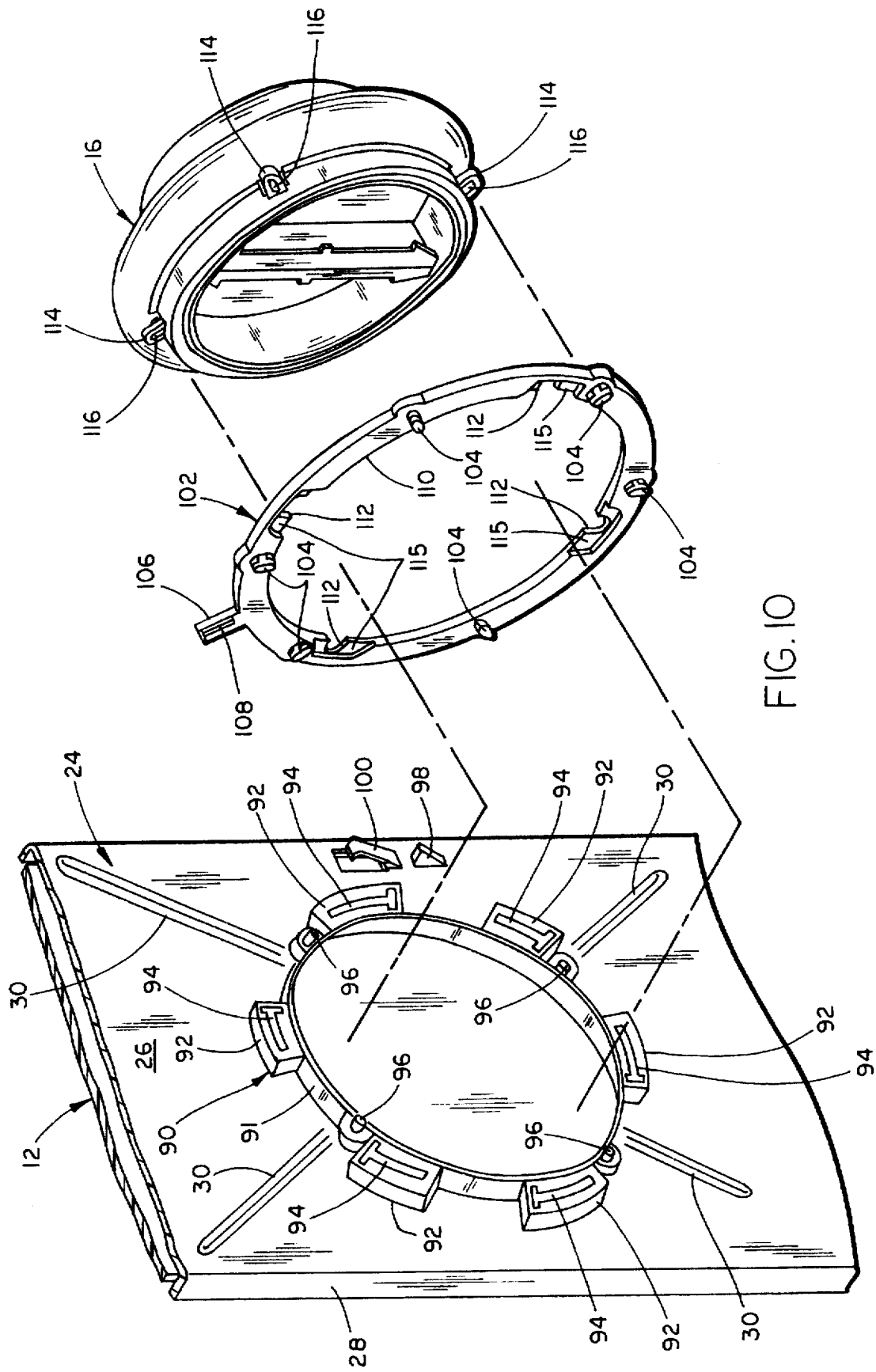
FIG. 10 is a fragmentary, exploded, perspective view of the releasable mounting assembly of FIG. 9.

Referring now to the drawings in greater detail, FIGS. 1-10 illustrate a first embodiment 10 of the exterior rearview mirror assembly of the present invention which is especially adapted for use on large vehicles, such as heavy trucks, vans, recreational vehicles and the like. Assembly 10 includes a reflective mirror element 12, resistive heating element 14 applied to the rear surface of mirror element 12, mirror mount/actuator 16, support bracket 18, and a one-piece, aerodynamically designed housing or shell 20 supported by bracket 18. As shown in FIGS. 3 and 4, mirror mount 16 is adapted to provide adjustable movement of mirror element 12 to various viewing positions about horizontal and vertical adjustment axes, preferably by remote control from the vehicle cab or passenger compartment when the actuator is electrically operated. Support bracket 18 spans the interior space of the mirror housing from adjacent one end to adjacent the opposite end and supports mount/actuator 16 to reduce vibration and weight and increase stability of the overall assembly, as will be more fully explained below.

As shown in FIGS. 1–4, mirror element 12 is a rectangular sheet or panel of glass having rounded corners, preferably having a thickness of 0.063–0.125 inches. A reflective coating 22 of a conventional chrome alloy or other metals or materials is applied by conventional coating methods to the front or first surface of mirror element 12, preferably providing reflection of at least about 55 percent of the light incident thereon. A resistive heating element or pad 14 having a rectangular configuration is preferably adhered to the rear surface of mirror element 12 with a suitable adhesive or tape. Preferably, heater pad 14 is an electrical resistance type element having a grid pattern of conductive ink applied to a mylar carrier substrate and is available from ITW Chronomatic of Chicago, Ill. When electrical voltage is applied by means of wires connected to the heater element and a power source in the vehicle, heater pad 14 provides increased temperature which is conducted through the mirror element 12 to melt ice or snow which may have collected on the first or exposed surface of the mirror element.

Mirror element 12 and heating element 14 are preferably supported and adhered to a generally planar mirror element support plate or member 24, best seen in FIGS. 3, 4, 9 and 10. Support plate 24 is preferably injection molded from a resinous plastic, such as 30% glass filled nylon, and has a rectangular shape corresponding to the shape of mirror element 12. Plate 24 includes a rear wall 26 and an outwardly extending peripheral side edge or rim 28 which defines a forwardly facing recess in which mirror element 12 is preferably secured by an adhesive, double-faced tape, or the like. One or more holes 29 (FIG. 9) in rear wall 26 allow connection of wires to heater pad 14 as described below. As explained more fully hereinafter, a releasable, bayonet-type mirror mounting assembly 91 is molded on the rear wall 26 of support plate 24 such that the subassembly of the mirror element 12, heater pad 14 and support plate 24 can be easily secured or removed as a unit from mirror mount/actuator 16. Preferably, support plate 24 also includes raised, molded, radially extending fibs 30.

Mirror mount 16 is preferably an electrically-operated, adjustable mounting assembly or actuator of the type sold under Model No. 530 by IKU USA, Inc. of Three Rivers, Mich. Electrical actuator 16 is of the type disclosed in U.S. Pat. Nos. 4,101,206 and/or 4,116,538, the disclosures of which are hereby incorporated by reference herein. Alternately, actuator 16 could be of the type disclosed in U.S. Pat. No. 4,281,899, the disclosure of which is also incorporated by referenced herein. Actuator 16 provides adjustment of the supported mirror element about two perpendicular axes, namely, a horizontal and vertical axis, for example, and includes a pair of electric motors 16a, 16b and rack and pinion gearing for movement of an actuator member to which support plate 24 is connected. Of course, other suitable electrically operated or manually operated adjustable mirror mounts could be used to support the mirror element 12, any heater pad 14 and support plate 24 on support bracket 18, as desired. As is shown in FIG. 3, actuator 16 is connected to a source of electrical power in the vehicle by means of a power cord 32 including a wire harness having wires 34 which extend through a strain relief grommet 36 and include releasable blade-type connectors 38 enabling the actuator to be easily disconnected for repair or replacement. Optionally, a manually adjustable, pivotal mirror mount may be substituted for actuator 16.

Mirror support bracket 18 is an elongated, truss-type bracket, preferably sand or die cast from a lightweight metal or metal alloy, such as 319, 356 or 380 aluminum alloy or magnesium, and electrostatically powder painted to provide increased stiffness and rigidity with reduced weight. Bracket 18 includes elongated, generally parallel side members 40 which extend the entire length of the bracket and curve into forwardly extending ends 42. Support members 40 are interconnected by a series of braces 44 which, in the preferred embodiment, form an X pattern which extends along the length of the bracket. Thus, braces 44 are formed in pairs 44a, 44b, 44c, 44d, 44e and 44f in which the braces intersect one another as well as joining the side members and define openings 46 therebetween. If desired, additional brace members 48 may be provided between the points of intersection of braces 44 such that they extend along the elongated axis of bracket 16 across the openings 46 between the points of intersection of braces 44. Braces 48 generally extend parallel to support members 40. If desired, additional cross braces 50 may be positioned to extend generally perpendicular to support members 40 and to intersect braces 48. At the approximate center of bracket 16 is a series of three upstanding securing posts 52 interconnected by walls 54. Posts 52 receive securing screws 56 which extend through actuator 16 to fasten the actuator to the support bracket (FIG. 2).

At opposite ends of bracket 18 are ends flanges 42 which extend toward the mirror element 12 from support members 40. End flanges 42 are supported by pairs of triangularly shaped gussets 58 and include outwardly extending molded, annular bosses or projections 60, each having a tapered aperture 62 therethrough for receipt of a mounting post or stud 64 (FIG. 7).

As shown in FIGS. 3 and 5, support members 40 and braces 48 each are generally planar and lie in planes which are substantially parallel to one another. The center section of left support member 40 is recessed at 41 and 43 to provide clearance for portions of actuator 16 and to provide access for wiring leading to the actuator. In addition, the height of each of the support members 40 and braces 44, 48 and 50 is increased in the center section of the support bracket to include a dimension A which is larger than the dimension B of the same members adjacent the ends of the bracket. This provides a greater bending moment and stiffness and, thus, greater resistance to bowing in and out and vibration, especially in the area where actuator 16 is supported.

As constructed, support bracket 18 reduces vibration of the reflective minor element 12 due to the orientation of the X pattern braces 44a–44f, which orientation reduces both linear and torsional vibration. The additional braces 48, 50 and the dimensions of both the support members and braces, as explained above, coupled with the openings between the braces provide increased stiffness and rigidity and reduced weight and mass for the bracket over prior known mirror supports, as well as an increased the natural frequency for the mirror support bracket. Through the use of lightweight sand or die cast metal alloys, such as aluminum or magnesium, the mass to stiffness ratio is reduced. Further, the curved configuration of the support bracket having ends which curve forwardly to provide a support axis extending through fastener posts 64, together with the support of the actuator 16 and mirror elements 12 on the side of the support bracket toward the mirror element substantially aligns the center of gravity of these elements with the pivot axis of the mirror assembly. Coupled with the use of thinner glass for the mirror element these features provide reduced vibration in the mirror assembly as well as avoidance of resonance when the assembly is mounted on appropriate support arms or brackets on the truck or other vehicle.

As is best seen in FIGS. 2, 3, 4 and 7, mirror housing 20 is a relatively thin, one piece shell including a rear wall 70, opposing and top and bottom end walls 72, 74 and opposing side walls 76, 78. The end and side walls define a peripheral rim 80 lying in a defined plane, rim 80 being preferably covered with an extruded, resinous plastic edge trim 81 which can include a desired color to match the housing. Optionally, trim 81 may include a chrome coated mylar film. Preferably, housing 20 is vacuum formed from plateable grade ABS sheet plastic, is colored black or another desired color, or may be covered with a chrome layer. Each end 72, 74 includes a through aperture 82, 84 (FIG. 7) into which boss 60 on the outer surface of the end flange of bracket 18 projects. Thus, when a cortically headed, threaded screw 64 is passed through each aperture 62 in the bracket, fastener posts or studs are provided which extend through apertures 82, 84 on a common axis generally parallel to the plane of rim 80 to provide a mounting or pivot axis for the entire assembly. Housing 20 is then secured on opposite sides of aperture 62 to end flanges 42 by means of a pair of screws 86 at either end. These are the only connections of the housing to the support bracket. Housing 20 does not provide any structural support for the mirror actuator 16 or mirror element 12. Housing 20 is also preferably rounded as shown to include a smooth, aerodynamic shape, and shields the support bracket, actuator and mirror element from wind and weather. In addition, peripheral rim 80 extends beyond the viewing surface of mirror element 12 such that the mirror element is recessed toward rear wall 70 of the housing a distance sufficient to reduce wind buffeting from the vehicle to which the mirror is mounted and to create an area of low turbulence on the mirror surface which not only reduces the amount of wind buffering but also prevents mist and dirt from collecting on the mirror surface to thereby improve viewing in the mirror. With fastening posts 64 projecting through the housing 20 as shown, mirror assembly 10 may be mounted on suitable support arms extending outwardly from a vehicle, such as a truck cab, in a fixed position or for pivotal movement about the axis of posts 64 to rotate the entire assembly toward or away from the vehicle cab as desired and as specified by the support arm manufacturer. Spacer nuts and lock washers 88 may be provided on each post 64 for spacing the support arms or brackets away from the mirror housing.

As shown in FIGS. 9 and 10, the releasable mounting assembly 90 for securing mirror element 12 and support plate 24 to the actuator 16 includes an upstanding, annular wall 91 substantially centered on the center of gravity of mirror element 12 and support plate 24 on rear wall 26. Extending radially outwardly from the outside surface of annular wall 91 at six equally spaced positions are hollow mounting projections 92 on the outside surface of wall 91 each including a curved, T-shaped slot 94 in the top surface thereof. At four equally spaced positions intermediate mounting projections 92 are mounting posts 96 which include cylindrical projections adapted to receive mounting feet on the actuator 16. Also included on rear wall 26 of support plate 24 are a pair of upstanding retaining latch members 98, 100. Latch member 100 is cantilevered to provide a spring action. Each latch member defines a point or apex adapted to mate with a handle on rotatable retaining ring 102 as explained hereinafter.

Mating with the T-shaped curved slots 94 in retaining projections 92 is an annular bayonet mounting ring 102 including six equally spaced, T-shaped mounting feet 104 adapted to be received through the transverse end of T-shaped slots 94 and allow rotation of the ring 102 between a closed, retaining position and an opened, release position. Ring 102 includes handle 106 which has a recess 108 thereunder for engaging latch projections 98, 100 in the two rotated positions offing 102. On the inner edge 110 of ring 102 are four equally spaced recesses 112 through which mounting feet 114 on actuator 16 are adapted to pass. Each mounting foot 114 includes a circular aperture 116 adapted to receive one of the mounting posts 96.

In use, projections 104 on ring 102 are inserted in the T-shaped slots 94 and ring 102 is rotated until recesses 112 are in registry with posts 96. Thereafter, support plate 24 is placed over actuator 16, which has already been mounted on support bracket 18 in the mirror housing, such that mounting posts 96 are aligned with mounting feet 114 and telescoped into engagement with apertures 116 through recesses 112 in the mounting ring. Thereafter, ring 102 is rotated counterclockwise such that projections 104 slide toward the smaller, closed end of slots 94 while flanges 115 adjacent recesses 112 cover the combination of feet 114 and posts 96 to prevent removal of the support plate from the actuator. Recess 108 provides a lock or latching action to retain ring 102 in its closed, retaining position with flanges 115 covering feet 114 and posts 96 by engaging the point or apex of latch member 100 with the underside of handle 106. The spring action of cantilevered member 100 allows the latch member to flex allowing the point or apex to pass into recess 108 without fracture. When removal of the mirror element support plate 24 and mirror element from actuator 16 is desired, ring 102 is rotated in the reverse or clockwise direction until recess 108 on handle 106 engages the point of latch member 98 when recesses 112 are aligned with feet 114 and posts 96 at which time the subassembly of the mirror element 12 and support plate 24 can be removed from the actuator. Since handle 106 is positioned near the side edge of support plate 24, it can be easily grasped and rotated in the manner described above by adjusting the mirror element on actuator 16 as shown in FIG. 4 to expose handle 106 between the edge of the support plate and rim 80 covered by trim strip 81.

As shown in FIGS. 3 and 4, when assembled in the above manner, with wires 34 connected to actuator 16 and any heating pad 14 on the rear surface of mirror element 12, actuator 16 may be controlled to position mirror 12 on support plate 24 such that it is angled either upwardly or downwardly or to either side without changing the position of the entire assembly and mirror housing 200 in its support arms or brackets on the vehicle. Moreover, the control for actuator 16 may be utilized to move the mirror element to an infinite number of intermediate positions where rotation around both vertical and horizontal axes is included. When supported as shown in FIG. 3, the center of gravity of the mirror element 12, support plate 24, releasable mounting assembly 90 and actuator 16 are positioned as close as possible to the axis defined by mounting posts 64 with respect to both the longitudinal dimension of bracket 18 and housing 20 as well as their lateral dimension (FIGS. 2 and 3). Such positioning of the center of gravity of the mirror assembly helps to reduce vibration when coupled with the increased linear and torsional stiffness of bracket 18 and the reduced weight provided by the truss or lattice work type construction.

As shown in FIGS. 11–15, a second embodiment 150 of the exterior rearview mirror assembly of the present invention is illustrated. Like numerals indicate like parts to those included in mirror assembly 10. Assembly 150 is similar to assembly 10 but includes a modified, electric actuator 152, a modified support bracket 154, and a modified one-piece mirror housing 156. Mirror assembly 150 includes planar first surface reflective mirror element 12, a heater pad 14, and a correspondingly shaped mirror support plate 24, all as described above in connection with assembly 10. However, support bracket 154 has been modified both in its connection to housing 156 and its structure.

As is best seen in FIGS. 11–14, support bracket 154 is elongated and curved like support bracket 18, and includes a pair of parallel, elongated support members 158 interconnected by pairs of intersecting, X pattern braces 160 just as in bracket 18. Support members 158 merge into end flanges 162 at opposing ends of the bracket, which end flanges curve forwardly toward mirror element 12, as in bracket 18. Each end flange 162 includes an aperture 164 therethrough for receipt of mounting post fasteners 64, as in assembly 10. In addition, each end of the support bracket 154 includes a pair of aligned, spaced mounting feet 166, 168. Upper feet 166 are spaced closer together than lower feet 168 such that when combined with housing 156, bracket 154 will be received in the housing in only one orientation to prevent misassembly. In addition, bracket 154 includes an additional transverse brace 170 in the center of the bracket. In addition, the side of bracket 154 facing mirror element 12 and support plate 24 includes a covering wall 172 which extends over the surfaces of support members 158, braces 160, 170 and extends from end to end of the bracket to substantially close all of the openings between the braces and support members. Support members 158 and braces 160, 170 lie in planes which are generally perpendicular to wall 172. An aperture 174 near the center of bracket 154 is provided through wall 172 to pass wires to the electrical actuator 152 which is mounted on a series of outwardly extending mounting posts 176, as shown in FIG. 13. Power cord 32' extends through strain relief grommet 36 such that wires 34' in power cord 32' may be extended to actuator 152 and heater pad 14 through aperture 174, as well as apertures 178 in support plate 24. The inclusion of covering wall 172 on bracket 154 in embodiment 150 further increases the linear and torsional rigidity of bracket 154 to further prevent and reduce vibration when actuator 152 and mirror element 12 are mounted thereon within housing 156. Wall 172 also helps increase the natural frequency of bracket 154 to prevent resonation when the mirror assembly is mounted on its support arms or bracket on the vehicle.

Figures 11, 12:
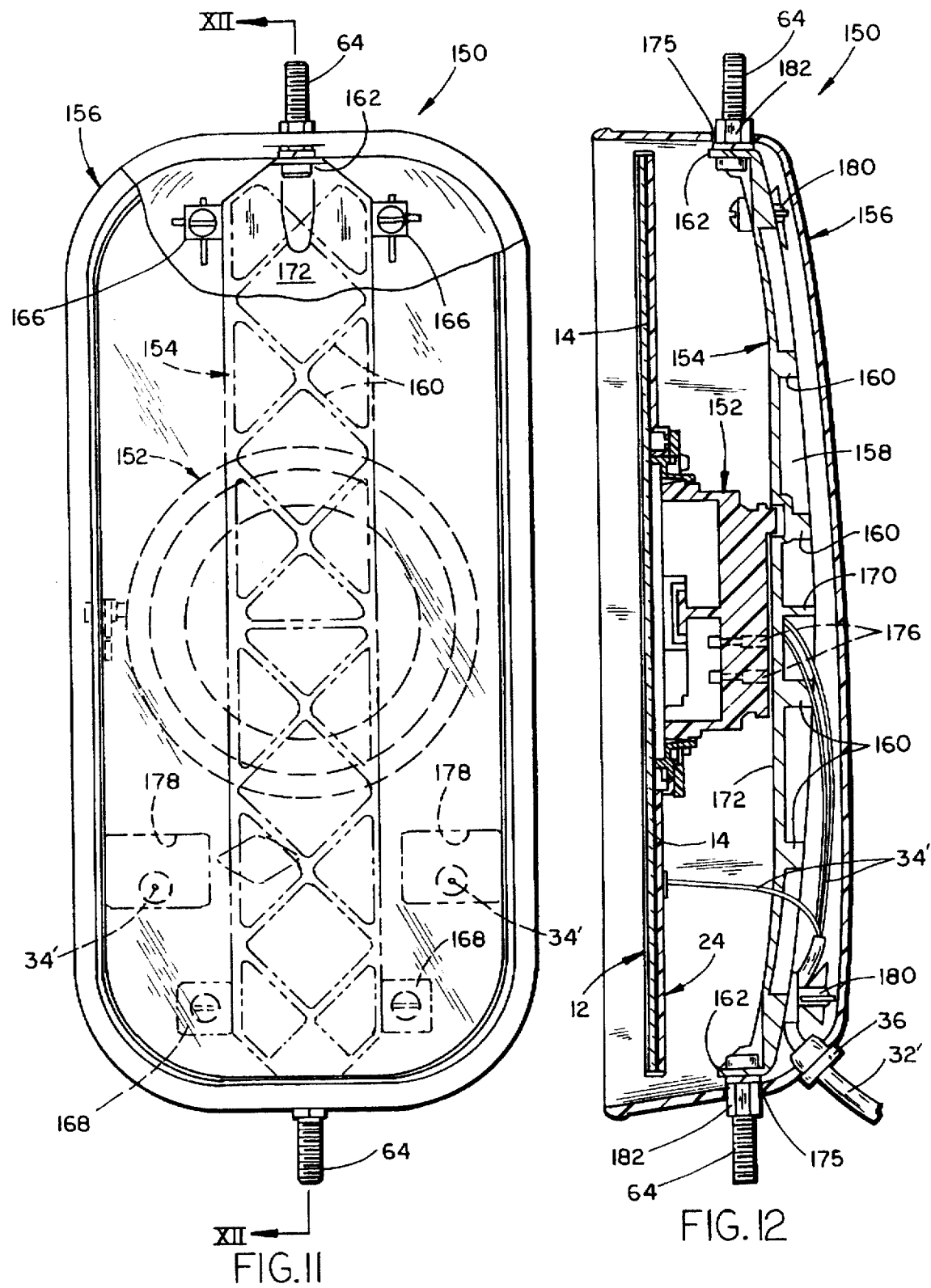
FIG. 11 is a front elevation with portions of the mirror element broken away of a second embodiment of the exterior rearview mirror assembly of the present invention.
FIG. 12 is a partially sectional, side elevation of the rearview mirror assembly of FIG. 11 taken along plane XII—XII of FIG. 11.

As is shown in FIGS. 11 and 12, housing 156 is preferably injection molded from resinous plastic such as plateable grade ABS in one piece and includes a rear wall, opposing side walls and opposing end walls. As with housing 20, housing 156 can be tinted to a desired color during molding or coated with a layer of chrome. However, housing 156 also includes inwardly projecting mounting bosses 180 (FIG. 12) which are spaced apart within the housing for registry with mounting feet 166, 168 on bracket 154. Thus, when feet 166 and 168 are secured to mounting posts 180 within the housing, bracket ends 162 are positioned adjacent to but spaced from the inside surface of the opposing ends of housing 156 such that apertures 164 are in registry with apertures 175 extending through the end surfaces of the housing. Mounting fasteners 64 may then be passed through apertures 164, 175 and secured with spacer nuts and lock washers 182 to provide a common axis for mounting the mirror assembly. When positioned in this manner, widely spaced bosses 180 on the interior of housing shell 156 provide spaced fastening points which add strength and rigidity to the assembly and help reduce flexing of the housing should the housing be grasped by an operator for pivotal movement on the axis provided by mounting posts 64.

Releasable attachment of the mirror element subassembly with mounting plate 24 to the actuator 152 is similar to that in assembly 10. As shown in FIGS. 11, 12 and 15, the mirror support plate 24 includes annular mounting wall 91 with projections 92 and T-slots 94 receiving rotatable ring 102 thereon as explained above. However, electric actuator 152 is a similar to actuator 16 but is modified to be somewhat smaller and sold under Model No. 540 by IKU USA, Inc. of Three Rivers, Mich. Actuator 152 also includes a pair of electric motors and suitable gearing to move support plate 24 and mirror element 12 about both horizontal and vertical axes, but requires the use of an adapter ring 184 which snaps onto wedge-shaped projections 186 provided on the outer periphery of actuator 152. Ring 184 includes outwardly projecting mounting feet 188 corresponding to mounting feet 114 in assembly 10. Once adapter ring 184 is snapped onto the periphery of actuator 152 via projections 186, the mirror element and support plate are mounted to mounting feet 188 offing 184 in substantially the same manner as described above in connection with actuator 16 for assembly 10 using rotatable ring 102. Alternately, as with actuator 16, a manually adjustable, pivotal mirror mount may be substituted for actuator 152.

As in assembly 10, the housing 156 of assembly 150 provides a shield against the affects of wind and weather while support bracket 154 provides structural support for actuator 152 and mirror element 12 with support plate 24. In addition, mirror element 12 is recessed toward the rear wall of housing 156 as in assembly 10 to provide for reduced wind buffering and low air turbulence thereby reducing collection of mist and dirt on the mirror surface. Bracket 154 reduces vibration transmitted to the viewing surface of the mirror through increased linear and torsional rigidity, increased natural frequency and reduced weight. Preferably, bracket 154 is sand or die cast from aluminum alloy or magnesium and painted as in bracket 18.

A third embodiment 200 of the exterior rearview mirror assembly of the present invention is shown in FIGS. 16–21. Like numerals indicate like parts to those in assemblies 10 or 150. Mirror assembly 200 differs from assemblies 10, 150 by the inclusion of a further modified support bracket 202 supporting a pair of electrical actuators 152, 152' at spaced positions, which actuators in turn support separate mirror elements 204, 206. Each of the individual mirror elements 204, 206 may be either planar or convex as explained below, and may be formed from glass or plastic. In addition, each mirror element may include a heating element or pad 14 therebehind. Further, one or both of the mirror elements 204, 206 may be an electro-optic mirror element adapted to reduce the reflectivity of light incident thereon upon the application of an electrical voltage to electrically responsive materials on the mirror element as is more fully explained below. Assembly 200 also incorporates a mirror housing or shell 156 like that used in assembly 150.

As is best seen in FIGS. 17–20, support bracket 202 is elongated and curved as is support bracket 16 and includes parallel, elongated support members 208 interconnected by pairs of intersecting, X pattern braces 210 just as in bracket 154. Likewise, support members 208 merge into end flanges 212 at opposing ends of the bracket, which end flanges curve forwardly toward mirror elements 204, 206 as in bracket 154. Each end flange 212 includes an aperture 214 therethrough for receipt of a fastener post 64 as in assemblies 10 and 150. In addition, each end of the support bracket includes a pair of aligned, spaced mounting feet 216, 218 which are spaced apart at different distances as in bracket 154 to allow mounting in only a single orientation to prevent misassembly. Further, bracket 202 includes a transverse brace 220 at the center extending generally perpendicular to support members 208, as well as a covering wall 222 which extends over the surfaces of support members 208, braces 210, 220, and extends from end to end of the bracket to substantially close all of the openings between the braces and support members. Apertures 224, 226 are provided adjacent each actuator 152, 152' to pass electrical wires therethrough. Each actuator 152, 152' is mounted on a series of outwardly extending mounting posts 228, 230 at positions spaced from one another near each end of the bracket. Power cord 32" extends through strain relief grommet 36 such that wires 34" in the power cord may be extended to each electrical actuator 152, 152' and each heater pad 14 through apertures 224, 226. The heater element wires extend through apertures in the mirror element support plates 236, 250 as explained below.

Each actuator 152, 152' is preferably of the type sold under Model No. 540 by IKU USA, Inc. of Three Rivers, Mich. Each actuator is secured to mounting posts 228, 230, respectively, by screws 229, 231 (FIG. 18). A subassembly of a reflective minor element and a mirror element support plate is releasably secured to each of the actuators 152 for movement about horizontal and vertical axes as controlled by the actuator from a remote location as set forth below.

Mirror element 204 preferably is an electro-optic mirror element adapted to provide a continuously variable reflectivity to reduce the reflectivity of light incident on the mirror element upon the application of an electrical voltage, although conventional first or second surface reflective mirror elements, either planar or convex, could be substituted as well. Most preferably, mirror element 204 is an electrochromic mirror element of the type described in published PCT Application No. WO 95/30495, filed Apr. 27, 1995, published Nov. 16, 1995, invented by Varaprasad et at. and assigned to Donnelly Corporation, the disclosure of which is hereby incorporated by reference herein. Mirror element 204 is of the type commercially available from Donnelly Corporation of Holland, Mich. As explained in PCT Application No. WO 95/30495, mirror element 204 includes a pair of glass substrates 260, 262 which are spaced apart to form a cavity, each substrate having a conductive coating 264, 266 on its inner surface. A reflective layer 268 is coated on one surface of the second substrate. An electrochromic solid film 270 is coated on one of the coating surfaces facing the cavity, while a liquid-phase or solid-phase electrolyte 272 comprising redox reaction promoters and alkali ions and/or protons is confined in the cavity by an edge seal 274 adjacent the substrate perimeters. Metal bus bar ribbon clips 276 are attached to one edge of each of substrates 260, 262 such as the top edge of glass substrate 262 and the bottom edge of substrate 260, or the opposing side edges of these substrates. Wires 34" are soldered to clips 276 to apply an electrical voltage potential from coatings 264,266 across film 270 and electrolyte 272. Film 270 is preferably a thin film layer of an inorganic transition metal oxide such as tungsten oxide. The electrical potential causes a color-forming reaction in film 270 which reduces the amount of light reflected by reflective layer 268. Electrical wires 34" in the wiring harness lead from power cord 32", to a switch or other control in the driver's compartment of the vehicle to control application of electrical energy to the mirror element and, thus, control its reflectivity.

Mirror element 204 is supported by a generally planar mirror element support plate 236 having a generally rectangular configuration similar to that of mirror element 204 and extends along approximately three-fifths to two-thirds of the length of the mirror assembly. Support plate 236 (FIGS. 17 and 18) includes through apertures 238 allowing access of wires to heater pad 14 applied to the rear surface of mirror element 204. Mirror support plate 236 also includes a releasable mounting assembly 90 including an annular wall 91, mounting projections 92, rotatable bayonet retaining ring 102 and adapter ring 184 just as in mirror assembly 150. Mirror element 204 is retained on mirror support plate 236 by a continuous, peripheral bezel 242 having resilient, barbed clips or flanges 244 which pass through apertures 246 at the edge of mirror support plate 236 adjacent peripheral wall 237 to retain the mirror element in place against mirror support plate 236. Following removal of the subassembly of mirror element 204 and support plate 236 from actuator 152 by means of releasable mounting assembly 90, mirror element 204 can be removed from support plate 236 by flexing flanges 244 inwardly and sliding bezel 242 outwardly away from the mirror element.

In a similar manner, an identical actuator 152' adjustably supports mirror element 206 and is mounted to securing posts 230 by screws 231. A molded support/backing member 250 including a peripheral rim 252 adapted to engage the retaining projections 186 on the periphery of actuator 152 is secured to the forward facing side of actuator 152. Convex mirror element 206, which includes a first surface reflective layer if formed from glass and a second surface reflective layer, if formed from plastic, is adhered within a recess on the forward facing side of support 250, as shown in FIG. 18. Electrical wires 34" leading from power cord 32" provide control from a remote switch or other control to adjust the position of convex mirror element 206 on actuator 152' from a remote location in the vehicle cab as with mirror element 204. Alternately, a manually adjustable, pivotable mirror mount may be substituted for either actuator 152 or 152' to support mirror element 204 or 206 on support bracket 202, if desired. Also, a fixed mirror mount may be substituted for actuator 152'.

As with mirror assembly 150, housing 156 is secured to mounting feet 216, 218 of support bracket 202 by suitable screws passed therethrough into projecting bosses 180 on the inside rear surface of the housing adjacent the upper and lower ends, as shown in FIGS. 17 and 18. Thereafter, conically headed threaded screws forming fastening posts 64 are passed through apertures 214 in support bracket ends 212 to extend outwardly along a common axis through apertures in the housing 156 for engagement with suitable support arms or brackets extending from the truck or other vehicle. Spacer nuts and lock washers 182 are provided on mounting posts 64 just as in assembly 150. Apertures 253 (FIG. 17) are provided through support member 250 for access by wires 34" to the heating element/pad provided on the rear surface of mirror element 206.

Accordingly, mirror elements 204, 206 may be individually adjusted about horizontal and vertical axes on actuators 152, 152' from a remote location within the vehicle to adjust the viewing position of each mirror element individually. Support bracket 202 has increased linear and torsional rigidity, as well as increased natural frequency to prevent resonation of the mirror assembly when mounted on the vehicle. Clearer, less blurry images in each of the mirror elements 204, 206 are provided when viewed by the vehicle driver. As with mirror assembly 150, mirror elements 204, 206 are recessed within the interior space of housing 156 toward the rear wall of the housing to reduce wind buffeting of the surfaces of the mirror elements and to prevent collection of mist and dirt on the mirror surfaces due to the creation of air turbulence, as in assemblies 10 and 150.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are as follows:

1. An exterior rearview mirror assembly for vehicles such as trucks comprising:

at least one reflective mirror element;

an elongated support bracket;

a mirror mount securing said mirror element to said support bracket to locate said mirror element in a viewing position;

a mirror housing secured to said support bracket and shielding said support bracket, mirror mount and mirror element, said housing having first and second end walls, first and second side walls, a rear wall and a peripheral rim defining an interior space within said housing and an opening adjacent said mirror element;

said support bracket spanning said interior space of said housing from a position adjacent said first housing end wall to a position adjacent said second housing end wall, being spaced from said side walls and rear wall of said housing, and including spaced, elongated support members and at least one brace extending between said support members whereby said assembly has reduced weight and vibration and improved stability.

2. The mirror assembly of claim 1 including a plurality of braces extending between said support members, said braces being spaced from one another and defining openings therebetween.

3. The mirror assembly of claim 2 wherein at least a first pair of said braces intersect to form an X-shaped pattern.

4. The mirror assembly of claim 3 wherein said support members are generally parallel to one another, said support bracket including a third brace extending between two of said plurality of braces and generally parallel to said support members.

5. The mirror assembly of claim 4 including a second pair of braces intersecting to form an X-shaped pattern, said third brace extending between the intersection of said first pair of braces and the intersection of said second pair of braces.

6. The mirror assembly of claim 5 including a fourth brace extending generally perpendicular to said support members and intersecting said third brace.

7. The mirror assembly of claim 2 including at least one mounting post extending toward said mirror element from one of said support members and braces for fastening said mirror mount.

8. The mirror assembly of claim 2 wherein said support bracket is secured to an interior surface of each of said first and second housing end walls.

9. The mirror assembly of claim 8 wherein each end of said support bracket includes a mounting stud projecting outwardly through an aperture in said housing for mounting said mirror assembly on a vehicle; said mounting studs being aligned on a common axis.

10. The mirror assembly of claim 2 wherein said housing includes at least one mounting area on the interior surface of said rear wall adjacent each of said end walls, said support bracket being secured to said mounting areas.

11. The mirror assembly of claim 10 wherein each end of said support bracket includes a mounting stud projecting outwardly through an aperture in said housing for mounting said mirror assembly on a vehicle; said mounting studs being aligned on a common axis.

12. The mirror assembly of claim 1 wherein the height of said support members is greater in the area intermediate the ends of said support bracket than at said bracket ends.

13. The mirror assembly of claim 1 wherein said support bracket includes two ends, one end being adjacent said first end wall of said housing, the other end being adjacent said second end wall of said housing; each end of said support bracket including a mounting stud projecting outwardly through an aperture in said housing for mounting said mirror assembly on a vehicle; said mounting studs being aligned on a common axis.

14. The mirror assembly of claim 13 wherein said support bracket ends extend toward said mirror element; said peripheral rim of said housing being in a predetermined plane; said mounting studs extending generally parallel to said plane of said rim.

15. The mirror assembly of claim 1 wherein said support bracket includes an opening between said brace and said support members, and a bracket wall extending along and between said support members and connecting said brace and support members, said wall closing said opening between said brace and support members.

16. The mirror assembly of claim 15 wherein said support members and brace extend generally perpendicular to said bracket wall and away from said mirror element, said bracket wall extending along the entire length of said support bracket.

17. The mirror assembly of claim 1 wherein said mirror mount is adjustable about at least one axis to provide movement of said mirror element within said housing to different viewing positions.

18. The mirror assembly of claim 17 wherein said mirror mount is an actuator including at least one electric motor adapted for connection to a control for moving said mirror element when the control is operated.

19. The mirror assembly of claim 17 including a second adjustable mirror mount and a second reflective mirror element, said second mirror mount providing movement of said second mirror element within said housing independently of the first of said mirror elements.

20. The mirror assembly of claim 19 wherein at least one of said mirror elements is selected from the group consisting of a planar mirror element and a convex mirror element.

21. The mirror assembly of claim 20 wherein the first of said mirror elements is planar and said second mirror element is convex.

22. The mirror assembly of claim 18 wherein said mirror element is an electrochromic mirror element.

23. The mirror assembly of claim 22 including electrical wiring adapted to connect a source of electrical power to said actuator electrical motor and said electrochromic mirror element, said wiring including connectors for disconnecting said wiring from each of said actuator and said mirror element.

24. The mirror assembly of claim 1 wherein said mirror element is an electro-optic element adapted to reduce the amount of reflected light when an electrical voltage is applied to said element.

25. The mirror assembly of claim 24 wherein said mirror element is an electrochromic mirror element.

26. The mirror assembly of claim 1 including an electric heating element on said mirror element for heating said mirror element to melt any ice and snow thereon.

27. The mirror assembly of claim 1 wherein said mirror element is recessed behind said peripheral rim of said housing in a direction toward said rear wall of said housing.

28. The mirror assembly of claim 27 wherein said housing is formed in one piece from resinous plastic.

29. The mirror assembly of claim 1 wherein said mirror element is secured to a mirror support member, said mirror support member including a releasable mounting assembly connecting said mirror support member to said mirror mount.

30. The mirror assembly of claim 29 wherein said releasable mounting assembly include a retaining member movable between at least a retaining position and a release position to retain and release said actuator, and a latch for maintaining said retaining member in said retaining position.

31. An exterior rearview mirror assembly for vehicles such as trucks comprising:
   a one-piece housing having opposing ends, sides and a rear wall defining an interior space and a mirror opening defined by a peripheral rim;
   a truss-type support bracket spanning said interior space within said housing from adjacent one of said opposing ends to adjacent the other of said opposing ends and having spaced support members interconnected by a plurality of braces extending between said support members and having openings therebetween, said support bracket being secured to said housing and spaced from said sides and rear wall;
   at least one reflective mirror element within said housing and visible through said mirror opening; and
   an adjustable mirror mount secured to said mirror element and said support bracket, said mirror mount providing for movement of said mirror element within said housing to different viewing positions.

32. The mirror assembly of claim 31 wherein at least a first pair of said braces intersect to form an X-shaped pattern.

33. The mirror assembly of claim 32 wherein said support members are generally parallel to one another, said support bracket including a third brace extending between two of said plurality of braces and generally parallel to said support members.

34. The mirror assembly of claim 33 including a second pair of braces intersecting to form an X-shaped pattern, said third brace extending between the intersection of said first pair of braces and the intersection of said second pair of braces.

35. The mirror assembly of claim 32 including a plurality of pairs of braces extending between said support members, each of said pairs of braces intersecting one another to form an X-shaped pattern whereby said support bracket includes a series of X-shaped brace pairs.

36. The mirror assembly of claim 31 wherein said support bracket is secured to an interior surface of each of said first and second housing end walls.

37. The mirror assembly of claim 31 wherein said housing includes at least one mounting area on the interior surface of said rear wall adjacent each of said end walls, said support bracket being secured to said mounting areas.

38. The mirror assembly of claim 31 wherein said support bracket includes opposing ends, each end of said support bracket including a mounting stud projecting outwardly through an aperture in said housing for mounting said mirror assembly on a vehicle; said mounting studs being aligned on a common axis.

39. The mirror assembly of claim 31 wherein said support bracket includes an opening between said brace and said support members, and a bracket wall extending along and between said support members and connecting said brace and support members, said wall closing said opening between said brace and support members.

40. The mirror assembly of claim 39 wherein said support members and brace extend generally perpendicular to said bracket wall and away from said mirror element, said bracket wall extending along the entire length of said support bracket.

41. The mirror assembly of claim 31 wherein said mirror mount is an actuator including at least one electric motor adapted for connection to a control for moving said mirror element when the control is operated.

42. The mirror assembly of claim 31 including a second adjustable mirror mount and a second reflective mirror element, said second mirror mount providing movement of said second mirror element within said housing independently of the first of said mirror elements.

43. The mirror assembly of claim 42 wherein at least one of said mirror elements is selected from the group consisting of a planar mirror element and a convex mirror element.

44. The mirror assembly of claim 31 wherein said mirror element is an electrochromic mirror element.

45. The mirror assembly of claim 31 including an electrical heating element on said mirror element for heating said mirror element to melt any ice and snow thereon.

46. The mirror assembly of claim 31 wherein said mirror element is recessed behind said peripheral rim of said housing in a direction toward said rear wall of said housing.

47. The mirror assembly of claim 31 wherein said mirror element is secured to a mirror support member, said mirror support member including a releasable mounting assembly connecting said mirror support member to said mirror mount.

48. An exterior rearview mirror assembly for vehicles such as trucks comprising:
   a mirror housing having opposing ends, opposing sides, a rear wall defining an interior space, and a peripheral rim defining an opening;
   an elongated support bracket within said housing;
   a pair of reflective mirror elements, and a pair of mirror mounts, one of said mirror elements mounted to said support bracket by one of said mirror mounts, the other of said mirror elements mounted to said support bracket at a position spaced from said one mirror mount by the other of said mirror mounts, at least one of said mirror mounts being adjustable to provide movement of said mirror element mounted thereon to different viewing positions;
   said support bracket spanning said interior space of said housing from adjacent one housing end to the other opposing housing end, being spaced from said sides and rear wall, and including spaced, elongated support members and at least one brace extending between said support members.

49. The mirror assembly of claim 48 including a plurality of braces extending between said support members, said braces being spaced from one another and defining openings therebetween.

50. The mirror assembly of claim 49 wherein at least a first pair of said braces intersect to form an X-shaped pattern.

51. The mirror assembly of claim 50 including a plurality of pairs of braces extending between said support members, each of said pairs of braces intersecting one another to form an X-shaped pattern whereby said support bracket includes a series of X-shaped brace pairs.

52. The mirror assembly of claim 48 wherein said support bracket is secured to an interior surface of each of said first and second housing ends.

53. The mirror assembly of claim 48 wherein said housing includes at least one mounting area on the interior surface of said rear wall adjacent each of said end walls, said support bracket being secured to said mounting areas.

54. The mirror assembly of claim 48 wherein said support bracket includes opposing ends, each end of said support bracket including a mounting stud projecting outwardly through an aperture in said housing for mounting said mirror assembly on a vehicle; said mounting studs being aligned on a common axis.

55. The mirror assembly of claim 48 wherein said support bracket includes an opening between said brace and said support members, and a bracket wall extending along and between said support members and connecting said brace and support members, said wall closing said opening between said brace and support members.

56. The mirror assembly of claim 55 wherein said support members and brace extend generally perpendicular to said bracket wall and away from said mirror element, said bracket wall extending along the entire length of said support bracket.

57. The mirror assembly of claim 48 wherein each of said mirror mounts is an actuator including at least one electric motor adapted for connection to a control for moving the respective mirror element when the control is operated.

58. The mirror assembly of claim 48 wherein at least one of said mirror elements is selected from the group consisting of a planar mirror element and a convex mirror element.

59. The mirror assembly of claim 58 wherein at least one of said mirror elements includes an electrical heating element for heating said mirror element to melt any ice and snow thereon.

60. The mirror assembly of claim 48 wherein at least one of said mirror elements is an electrochromic mirror element.

61. The mirror assembly of claim 48 wherein each of said mirror elements is recessed behind said in a direction toward said rear wall of said housing.

62. The mirror assembly of claim 48 wherein each of said mirror elements is secured to a mirror support member, said mirror support members each including a releasable mounting assembly connecting its respective said mirror support member to its respective mirror mount.

* * * * *

UNITED STATES PATENT AND TRADEMARK OFFICE
CERTIFICATE OF CORRECTION

PATENT NO. : 5,721,646
DATED : February 24, 1998
INVENTOR(S) : Michael R. Catlin et al.

It is certified that error appears in the above-identified patent and that said Letters Patent is hereby corrected as shown below:

In the Abstract, line 2:

"recreation" should be --recreational--.

Column 1, line 5:

"minors" should be --mirrors--.

Column 1, line 10:

"minors" should be --mirrors--.

Column 2, line 32:

"minor" should be --mirror--.

Column 3, line 22:

"buffering" should be --buffeting--.

Column 5, line 4:

"comers" should be --corners--.

UNITED STATES PATENT AND TRADEMARK OFFICE
CERTIFICATE OF CORRECTION

PATENT NO. : 5,721,646
DATED : February 24, 1998
INVENTOR(S) : Michael R. Catlin et al.

It is certified that error appears in the above-identified patent and that said Letters Patent is hereby corrected as shown below:

Column 5, line 40:

"fibs" should be --ribs--.

Column 6, line 46:

"minor" should be --mirror--.

Column 7, line 14:

"cortically" should be --conically--.

Column 7, line 33:

"buffering" should be --buffeting--.

Column 8, line 4:

"offing" should be --of ring--.

Column 9, line 40:

"Wail" should be --Wall--.

Column 9, line 46:

"wail" should be --wall--.

UNITED STATES PATENT AND TRADEMARK OFFICE
CERTIFICATE OF CORRECTION

PATENT NO. : 5,721,646
DATED : February 24, 1998
INVENTOR(S) : Michael R. Catlin et al.

It is certified that error appears in the above-identified patent and that said Letters Patent is hereby corrected as shown below:

Column 9, line 47:

"wails" should be --walls--.

Column 10, line 4:

"wail" should be --wall--.

Column 10, line 19:

"offing" should be --of ring--.

Column 10, line 30:

"buffering" should be --buffeting--.

Column 11, line 6:

"dose" should be --close--.

Column 11, line 22:

"minor" should be --mirror--.

Column 11, line 35:

"at." should be --al.--.

UNITED STATES PATENT AND TRADEMARK OFFICE
CERTIFICATE OF CORRECTION

PATENT NO.   : 5,721,646
DATED        : February 24, 1998
INVENTOR(S)  : Michael R. Catlin et al.

It is certified that error appears in the above-identified patent and that said Letters Patent is hereby corrected as shown below:

Column 14, line 7:

"minor" should be --mirror--.

Column 14, line 12:

"minor" should be --mirror--.

Column 14, line 67:

"wail" should be --wall--.

Signed and Sealed this

Sixteenth Day of January, 2001

Attest:

Q. TODD DICKINSON

*Attesting Officer*          *Commissioner of Patents and Trademarks*